(12) United States Patent  
Riehm et al.

(10) Patent No.: US 8,221,831 B2
(45) Date of Patent: Jul. 17, 2012

(54) MATERIALS FOR TRAVELLED SURFACES (75) Inventors: Michael Riehm, Toronto (CA); Dietmar Bischoff, Kitchener (CA); Amilcar Salumbo, Mississauga (CA)

(73) Assignee: Envirobond Products Corporation, Mississauga, Ontario (CA)

( * ) Notice: Subject to any disclaimer, the term of this patent is extended or adjusted under 35 U.S.C. 154(b) by 1133 days.

(21) Appl. No.: 11/575,271

(22) PCT Filed: Sep. 19, 2005

(86) PCT No.: PCT/CA2005/001433
§ 371 (c)(1),
(2), (4) Date: Sep. 18, 2007

(87) PCT Pub. No.: WO2006/029539
PCT Pub. Date: Mar. 23, 2006

(65) Prior Publication Data
US 2011/0064872 A1    Mar. 17, 2011

Related U.S. Application Data (60) Provisional application No. 60/610,524, filed on Sep. 17, 2004.

(51) Int. Cl.
*B05C 1/16* (2006.01)
*B05D 5/10* (2006.01)
*E01C 5/00* (2006.01)
*E01C 11/24* (2006.01)
*E01C 17/00* (2006.01)
*C09D 5/14* (2006.01)
*C04B 7/00* (2006.01)
*C04B 7/34* (2006.01)
*C04B 28/00* (2006.01)
*C04B 32/00* (2006.01)

(52) U.S. Cl. ...... 427/136; 106/792; 106/638; 106/15.05
(58) Field of Classification Search .................. None
See application file for complete search history.

(56) References Cited

U.S. PATENT DOCUMENTS 3,696,559 A    10/1972    Hatton
(Continued)

FOREIGN PATENT DOCUMENTS
EP    05787615.3    1/2010
(Continued)

OTHER PUBLICATIONS

Naylor, Rosamond. "Herbicides in Asian Rice: transitions in Weed Management". 1996. Stanford University: Institute for International Studies. p. 111. Retrieved on Jul. 22, 2011. Retrieved from [http://books.google.com/books?id=YEI_ws_dFesC&printsec=frontcover&source=gbs_ge_summary_r&cad=0#v=onepage&q&f=false].*

(Continued)

Primary Examiner — Anthony J Green
Assistant Examiner — Karam Hijji (57) ABSTRACT A mixture of material for providing at least a portion of a travelled surface. The mixture includes an aggregate with a plurality of particles. The mixture also includes a hydrocolloidal agent adapted to swell upon exposure to water to form a resilient and flexible binder, for substantially binding the particles of the aggregate together. The aggregate and the hydrocolloidal agent have an initial pH. The mixture also includes an agent for elevating the initial pH to a predetermined pH, and a hydrophilic agent.

3 Claims, 7 Drawing Sheets

U.S. PATENT DOCUMENTS

| | | | |
|---|---|---|---|
| 3,950,179 A | | 4/1976 | Schneider |
| 4,523,755 A | | 6/1985 | Turba |
| 5,000,783 A | | 3/1991 | Dingeman et al. |
| 5,171,361 A | | 12/1992 | Dingeman et al. |
| 5,294,250 A | | 3/1994 | Panigraphy et al. |
| 5,306,327 A | | 4/1994 | Dingeman et al. |
| 5,395,930 A | * | 3/1995 | Bartz et al. ............... 536/92 |
| 5,685,893 A | | 11/1997 | Field et al. |
| 5,698,007 A | | 12/1997 | Schmitt |
| 5,746,546 A | * | 5/1998 | Hubbs et al. ............... 405/263 |
| RE35,989 E | | 12/1998 | Hubbs, Jr. et al. |
| 6,071,325 A | | 6/2000 | Schmitt |
| 6,497,746 B1 | | 12/2002 | Steeghs et al. |
| 6,777,465 B2 | | 8/2004 | Haile |
| 6,821,332 B2 | | 11/2004 | Hubbs |
| 2002/0161071 A1 | * | 10/2002 | Mills et al. ............... 524/2 |
| 2004/0149172 A1 | * | 8/2004 | Jardine et al. ............... 106/724 |
| 2004/0208709 A1 | * | 10/2004 | Marsden ............... 405/264 |
| 2005/0120916 A1 | | 6/2005 | Hubbs |
| 2005/0129904 A1 | | 6/2005 | Hubbs |
| 2005/0215153 A1 | | 9/2005 | Cossement |

FOREIGN PATENT DOCUMENTS

| | | | |
|---|---|---|---|
| JP | 11209188 | | 8/1999 |
| WO | WO 92/05290 | | 4/1992 |
| WO | WO 03/037817 | | 5/2003 |
| WO | WO03037817 | * | 5/2003 |
| WO | WO 2005/025316 | | 3/2005 |

OTHER PUBLICATIONS

Kronlof, A. "Effect of very fine aggregate on concrete strength". 1994. vol. 27. Retrieved from http://www.springerlink.com/content/ch0t13368p611831/fulltext.pdf.*

Engineering and Contracting. 1907. vol. 27. p. 155. Retrieved from http://books.google.com/books?id=o7FEAQAAIAAJ&printsec=frontcover&source=gbs_ge_summary_r&cad=0#v=onepage&q&f=false.*

International Preliminary Report and Written Opinion, re PCT/CA2005/001433, Envirobond Products Corporation et al., dated Mar. 20, 2007.

European Search Report Application 0573615.3, Jan. 25, 2010.

* cited by examiner

MATERIALS FOR TRAVELLED SURFACES

This application claims the benefit of U.S. Provisional Application 60/610,524 filed on Sep. 17, 2004.

FIELD OF THE INVENTION

This invention is related to materials for travelled surfaces.

BACKGROUND OF THE INVENTION

Various materials for travelled surfaces (or portions thereof) for pedestrian or light vehicle traffic are known. For example, a travelled surface such an outdoor patio or sidewalk may have a segmental pavement system which includes "hardscaping" elements (e.g., discrete pavement stones). The pavement stones, which are usually somewhat irregularly shaped, are spaced apart from each other on a base, resulting in gaps between the stones. In the prior art, these gaps are filled with a variety of materials to approximately the height of adjacent pavement stones, so that the travelled surface is easier to travel over. The material placed in the gaps (often referred to as "jointing material") also assists in holding the pavement stones in place. Accordingly, where the segmental paving system is used in the travelled surface, jointing material positioned in the gaps between the hardscaping elements provides at least a portion of the travelled surface.

In the prior art, an untreated aggregate is often used as the jointing material, i.e., an aggregate without any additives included therein. Typically, the aggregate is manufactured, i.e., a product of processes which are well known in the art. However, any suitably sized aggregate may be used. The type of aggregate which is used to fill the gaps in the prior art is sand or crushed stone of generally smaller diameter, usually depending on the widths of the gaps to be filled.

The untreated aggregate is an unsatisfactory jointing material for a number of reasons. For instance, the untreated aggregate tends to erode relatively quickly. Also, the untreated aggregate provides a number of crevices and holes in which germination of seeds often occurs, especially after some erosion has taken place. This is undesirable both for esthetic reasons and because plants may obstruct travel over the travelled surface, e.g., if they are sufficiently large.

One possible solution to the problems resulting from using untreated aggregate as the jointing material is to use concrete instead, because concrete would resist erosion better. However, when concrete is used as jointing material, it tends to crack due to movement of the base, and/or movement of the pavement stones relative to each other. Such movement can occur for a number of reasons, such as heaving of the base due to its freezing and thawing, or subsidence of parts of the base at different rates, for example. Germination of seeds can take place in the cracks resulting from the movement.

From the foregoing, it can be seen that there is a need for a jointing material which resists erosion well but is also flexible and resilient, so that movement of pavement stones relative to each other and movement in the base can be accommodated.

Many travelled surfaces do not include hardscaping elements. In the prior art, these travelled surfaces (which are usually trails or paths) can be made of different materials, such as untreated aggregate, asphalt, or wood chips. However, each of these materials has one or more disadvantages. For instance, untreated aggregate is relatively easily eroded, and plants can germinate in the aggregate. Asphalt is relatively expensive, and tends to crack over time due to uneven settlement of the base or frost heaving. Wood chips do not provide a cohesive surface, and therefore are somewhat inconvenient for some applications.

In the prior art, aggregate has been mixed with psyllium alone. However, in this context, the psyllium tends to decay and/or to be leached out by rainwater. Also, psyllium, when used alone in aggregate, does not discourage plant growth. Therefore, the use of psyllium alone, with aggregate, does not provide satisfactory results in a travelled surface.

Accordingly, there is a need for an improved material for providing at least a portion of a travelled surface.

SUMMARY OF THE INVENTION

In its broad aspect, the invention provides a mixture for providing at least a portion of a travelled surface. The mixture includes an aggregate comprising a plurality of particles. The mixture also includes one or more hydrocolloidal agents adapted to swell upon exposure to water to form a resilient and flexible binder, for substantially binding the particles of the aggregate together. The aggregate and the hydrocolloidal agent have an initial pH. Also, the mixture includes one or more agents for elevating the initial pH to a predetermined pH.

In another aspect, the mixture additionally includes one or more hydrophilic agents.

In another of its aspects, the invention provides a mixture of material for providing at least a portion of a travelled surface. The mixture includes an aggregate comprising a plurality of particles. The mixture also includes one or more hydrocolloidal agents adapted to swell upon exposure to water to form a resilient and flexible binder, for substantially binding the particles of the aggregate together. In addition, the mixture includes one or more herbicidal agents for at least partially inhibiting plant growth in the mixture.

In yet another aspect, the mixture additionally includes one or more hydrophilic agents.

In another aspect, the herbicidal agent is lime.

In another aspect, the mixture additionally includes one or more anti-leaching agents, for substantially inhibiting leaching of the hydrocolloidal agent from the mixture.

In yet another aspect, the mixture additionally includes one or more anti-decay agent, for substantially inhibiting decay of the hydrocolloidal agent.

In another aspect, the invention provides a mixture of materials for providing at least a portion of a travelled surface in which the mixture includes at least about 95% and at most about 99.6% by weight an aggregate, at least about 0.3% and at most about 2.5% by weight a hydrocolloidal agent, and at least about 0.1% and at most about 2.5% by weight a herbicidal agent.

In another aspect, the invention provides a mixture of materials for providing at least a portion of a travelled surface in which the mixture includes at least about 95% and at most about 99.6% by weight a manufactured aggregate, at least about 0.3% and at most about 2.5% by weight a hydrocolloidal agent, and at least about 0.1% and at most about 2.5% by weight an anti-leaching agent.

In another aspect, the invention provides a mixture of materials for providing at least a portion of a travelled surface in which the mixture includes at least about 95% and at most about 99.6% by weight an aggregate, at least about 0.3% and at most about 2.5% by weight a hydrocolloidal agent, and at least about 0.1% and at most about 2.5% by weight an anti-decay agent.

In another aspect, the invention provides a mixture of materials for providing at least a portion of a travelled surface in which the mixture includes at least about 95% and at most about 99.6% by weight an aggregate, at least about 0.3% and at most about 2.5% by weight a hydrocolloidal agent, and at least about 0.1% and at most about 2.5% by weight lime.

In another aspect, the mixture additionally includes at least about 0.1% and at most about 2.5% by weight a hydrophilic agent.

In another aspect, the hydrophilic agent is soda ash.

In yet another aspect, the invention provides a binder mixture for binding particles in an aggregate together. The binder mixture includes one or more hydrocolloidal agents and one or more agents for elevating pH.

In another of its aspects, the binder mixture includes one or more hydrophilic agents.

BRIEF DESCRIPTION OF THE DRAWINGS

The invention will be better understood with reference to the drawings, in which.

DETAILED DESCRIPTION OF THE PREFERRED EMBODIMENT(S)

The present invention may be understood more readily by reference to the following detailed description of the invention and the examples provided herein. It is to be understood that the aspects described below are not limited to specific methods or compounds, and as such may, of course, vary. It is also to be understood that the terminology used herein is for the purpose of the describing particular aspects only and is not intended to be limiting.

In this specification and in the claims that follow, reference will be made to a number of terms that shall be defined to have the following meanings.

Articles: As used in the specification and the appended claims, the singular forms "a", "an" and "the" include plural references unless the context clearly dictates otherwise. Thus, for example, reference to "an aggregate" includes mixtures of one or more aggregates, reference to "a hydrocolloidal agent" includes mixtures of one or more hydrocolloidal agents, and the like.

About: Often, ranges are expressed herein as from "about" one particular value, and/or to "about" another particular value. When such a range is expressed, another embodiment includes from the one particular value and/or to the other particular value. Similarly, when values are expressed as approximations, by use of the antecedent "about", it will be understood that the particular value forms another embodiment. It will be further understood that the endpoints of each of the ranges are significant both in relation to the other endpoint, and independently of the other endpoint.

Aggregate: An aggregate is a collection of particles (such as rock fragments, mineral fragments, crystals, or similar materials), including (without limiting the generality of the foregoing) sand, crushed stone, gravel, broken stone, and slag.

Optional: "Optional" or "optionally" means that the subsequently described event or circumstance may or may not occur, and that the description includes instances where the event or circumstance occurs and instances where it does not.

Weight Percent: A weight percent (%) of a component, unless specifically stated to the contrary, is based on the total weight of the formulation or composition in which the component is included.

Travelled Surface: A "travelled surface" includes, but is not limited to, any pathway, trailway, driveway, sidewalk, patio, or similar route over which pedestrian and vehicular traffic may travel.

Preferably, the present invention includes a mixture of material for providing at least a portion of a travelled surface. The mixture preferably includes an aggregate, one or more hydrocolloidal agents, and one or more agents for elevating pH. The aggregate is made up of a plurality of particles, and may be sand or crushed stone, as will be described. The hydrocolloidal agent is adapted to swell upon exposure to water to form a resilient and flexible binder, for substantially binding the particles of the aggregate together.

Preferably, the agent for elevating pH is lime. As will be described, the elevation of pH of the aggregate and the hydrocolloidal agent to a predetermined extent has been determined, surprisingly, to effect a number of desirable results.

Although it is preferable that the aggregate is a manufactured aggregate—so that the mixture of the invention can be prepared on the basis of each component thereof having known characteristics—it is not necessary that manufactured aggregate be used. Other aggregate materials, e.g., naturally formed sand or gravel, may be used in the mixture of the invention.

Although various hydrocolloidal agents could be used, the preferred hydrocolloidal agent is psyllium. Psyllium refers to the husk of the psyllium seed which contains a mucilaginous material, i.e., psyllium is an organic binder with mucilaginous properties. The amount of psyllium in the jointing material varies between about 0.3% and about 2.5% by weight of the jointing material. In the preferred embodiment, psyllium makes up between about 0.5% and about 1.5% by weight of the jointing material. Upon exposure of psyllium to water, the psyllium forms a mucilage-like gel which substantially binds the particles of the aggregate together. Preferably, the mixture is allowed to cure or "set" for a certain period of time after exposure to water, as will be described. After drying, the psyllium hardens to form a generally flexible and resilient bond among and between the particles of the aggregate. However, because the bond is a physical bond, it is reusable and therefore has "self-healing" properties, as will be described.

Preferably, the amount of lime in the mixture of material of the invention varies between about 0.1% and about 2.5% by weight. However, in the preferred embodiment, lime makes up between about 0.5% and about 1.5% by weight of the mixture. Lime is preferred because it provides multiple beneficial effects, as will be described.

Figure 1A:
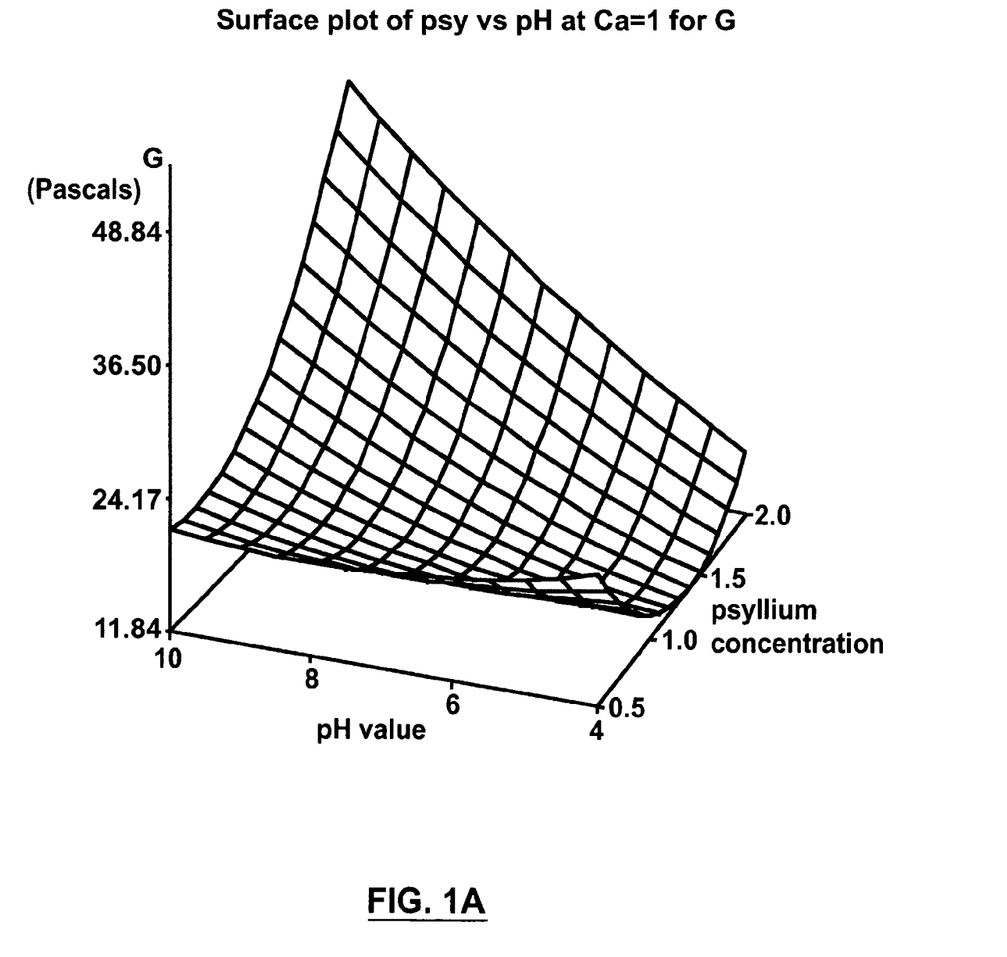
FIG. 1A is a surface plot of gel strength against psyllium concentration and pH.

Preferably, dolomitic hydrated lime ($Ca(OH_2)Mg(OH_2)$) is used as the agent for elevating pH: As can be seen in FIG. 1A, for concentrations of psyllium between about 0.5% and about 2.0% by weight, increases in pH increase the gel strength. Accordingly, the relatively high pH resulting from the addition of lime has the beneficial effect that it increases the strength of the mucilaginous gel. Increases in pH may also be caused by the addition of one or more alternatives to lime.

In the absence of the lime, the aggregate and the psyllium together have an initial pH of between about 5.0 and about 7.5. With the addition of lime, the pH of the mixture is elevated to between about 9.0 and about 12.0.

From the foregoing, it can be seen that, in the preferred embodiment of the mixture, because of the elevation of pH caused by lime, lime simultaneously has three different positive effects, through at least three different mechanisms. First, because lime elevates the pH of the mixture, the lime functions as a herbicidal agent. This is because the relatively high pH of lime tends to limit weed and fungi growth. Second, upon exposure of lime in the mixture to water, a certain proportion of the lime appears to form a cementing compound which helps to bind the psyllium to the aggregate's particles, thereby assisting in resisting the leaching of the psyllium from the jointing material. Also, as noted above, increasing the pH also has the surprising effect of increasing the strength of the gel formed by the psyllium. In this way, the lime functions as an anti-leaching agent. Finally, the relatively high pH resulting from the lime also discourages microbial decay of the psyllium. The lime tends to drastically slow biodegradation of the psyllium—i.e., the lime also functions as an anti-decay agent. Accordingly, lime is the preferred herbicidal agent, the preferred anti-leaching agent, and the preferred anti-decay agent. However, other herbicidal agents, anti-leaching agents, and anti-decay agents could be used, instead of or in addition to lime.

However, although lime has a number of beneficial effects, it is substantially hydrophobic. Because it is necessary that water contacts the psyllium in the jointing material in order to cause the psyllium to form the mucilage-like gel which serves to bind the particles of the aggregate together, the mixture of the invention preferably additionally includes a hydrophilic agent, for attracting water to the mixture of the invention, i.e., to overcome or mitigate the hydrophobic effects of the lime. The jointing material preferably includes between about 0.1% and about 2.5% by weight of the hydrophilic agent. However, in the preferred embodiment, the hydrophilic element comprises between about 0.2% and about 1.2% by weight of the mixture of the invention.

Although various hydrophilic agents could be used, the preferred hydrophilic agent is soda ash. Preferably, the hydrophilic agent is light soda ash anhydrous ($Na_2CO_3$). Another hydrophilic agent which could be used is clay, which may also help in cementing the hydrocolloidal agent to particles of aggregate and have other beneficial effects.

In the preferred embodiment, all three components (i.e., psyllium, lime, and soda ash) not only work to "glue" the mixture of the invention together upon installation thereof, but all three components remain fully re-usable to allow for self-repair, as will be described.

From the foregoing, it can be seen that the mixture of the invention includes between about 95% and about 99.6% by weight of the aggregate. The mixture also includes between about 0.3% and about 2.5% by weight the hydrocolloidal agent. The mixture also includes between about 0.1% and about 2.5% by weight the agent for elevating pH (preferably lime). Also, the mixture includes between about 0.1% and about 2.5% by weight the hydrophilic agent (preferably soda ash).

Other compounds could be used. For example, if lime were not used, one or more alternative pH-elevating agents could be used. Similarly, alternative herbicidal agents, anti-leaching agents, and anti-decay agents could be used.

Also, a binder mixture of the invention preferably includes the hydrocolloidal agent and the agent for elevating pH. Preferably, the binder mixture also includes the hydrophilic agent. The binder mixture is for binding particles in an aggregate together to form a mixture of the binder mixture and the aggregate.

In use, where the mixture is to provide a portion of a travelled surface between pavement stones and the gaps are generally less than about ⅜ inch in width, the mixture preferably includes angular joint sand as the aggregate. Optimal gradation specifications for the preferred sand aggregate are set out in Table 1 below. The sand aggregate, the hydrocolloidal agent (e.g., psyllium), and the herbicidal agent (e.g., lime) are mixed together to form a mixture 9. As described above, the mixture also preferably includes the hydrophilic agent (e.g., soda ash). (Alternatively, the binder mixture is mixed with sand to form a mixture 9.)

Figure 1B:
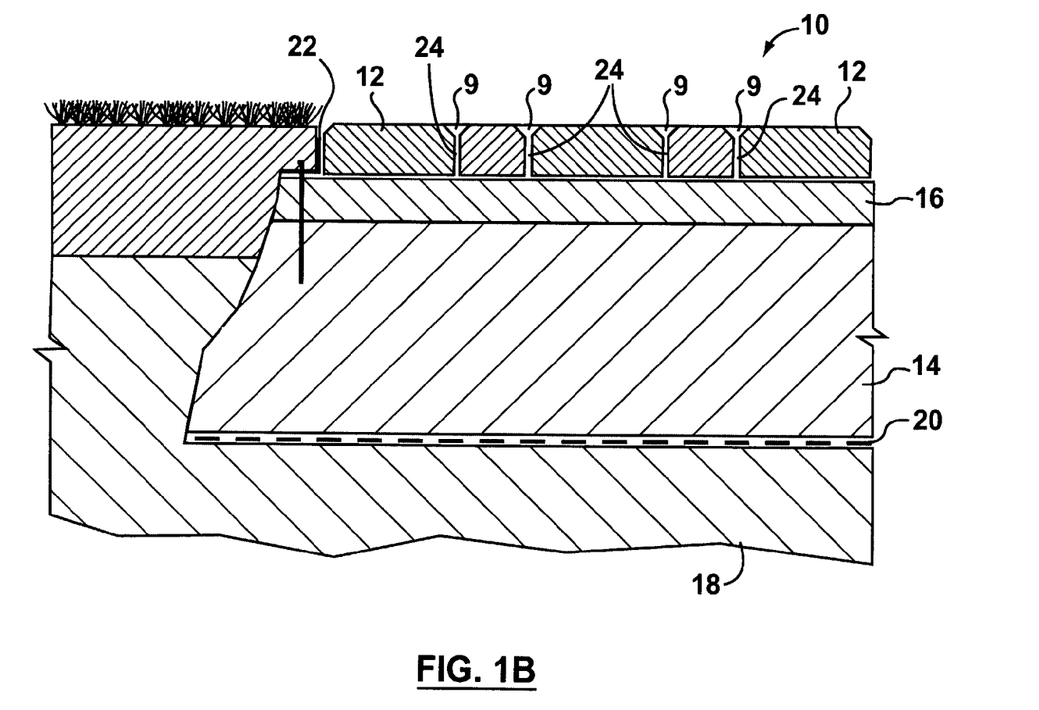
FIG. 1B is a cross-section of a travelled surface with hardscaping elements with an embodiment of a mixture of the invention.

An embodiment of a travelled surface 10 formed using the mixture of the invention is shown in FIG. 1B. The travelled surface 10 includes pavement stones 12. Base material 14 and bedding material 16 are positioned on a subgrade 18, as is generally known in the art. A geotextile material 20 may be positioned between the base 14 and the subgrade 18, if the subgrade 18 is cohesive (as is known in the art). An edge restraint 22 is preferably positioned around the edge of the travelled surface 10.

After the pavement stones 12 are positioned on the bedding material 16 to form gaps 24, the mixture of the invention 9 is positioned in the gaps 24. This may be done by sweeping material 9 off the pavement stones 12 into the gaps 24, to fill the gaps. A plate compactor (not shown) is then used to compact the pavement stones 12 in place. Additional material 9 may be required to be added in order to top up the gaps after such compaction. It should be noted that this compaction is not intended to compact the mixture 9. Compaction of the mixture 9 before it has been watered would impede exposure of the entire mixture 9 when it is watered.

TABLE 1

EnviroSand Jointing Material

| Sieve No. | Sieve Size (mm) | Lower Limit | Upper Limit |
|---|---|---|---|
| 16 | 1.18 | 90% | 100% |
| 30 | 0.600 | 65% | 80% |
| 50 | 0.300 | 30% | 55% |
| 100 | 0.150 | 10% | 25% |
| 200 | 0.075 | 5% | 10% |
| PAN | PAN | 0% | 5% |

After compaction of the pavement, stones and such topping-up of material 9 as may be appropriate, the mixture 9 is then watered. Preferably, the watering is done by using a continual fine mist, in order to avoid washing the mixture 9 from the gaps (joints). A uniform and rapid contact of the psyllium with water is important because it leads to uniformity in hydration of the psyllium vertically and horizontally in the mixture 9. This is because initial water saturation helps to activate the mucilage of the organic binder. Accordingly, it is important to fully saturate the mixture 9 with water. After watering, the mixture is allowed to cure (dry). In general, a minimum of approximately two hours should be allowed for curing on installation, but the length of time needed for curing varies, generally depending on the weather.

Figure 1C:
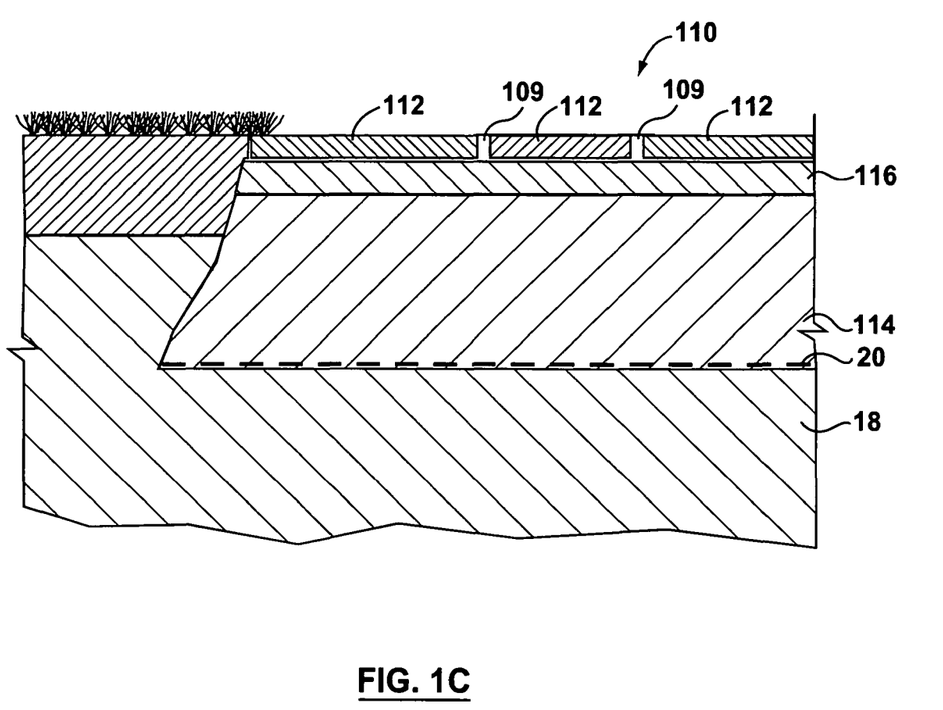
FIG. 1C is a cross-section of a travelled surface with hardscaping elements using an alternative embodiment of the mixture of the invention.
Figure 1D:
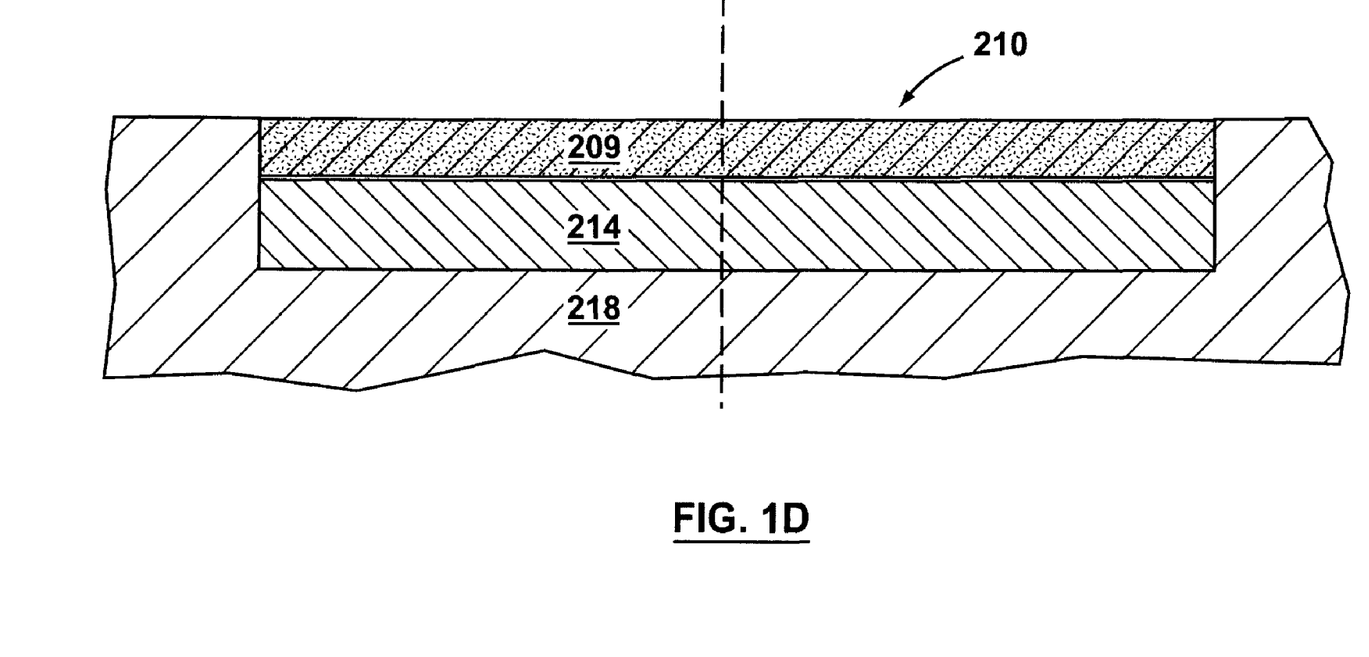
FIG. 1D is a cross-section of a travelled surface comprising another alternative embodiment of the invention.
Figure 1E:
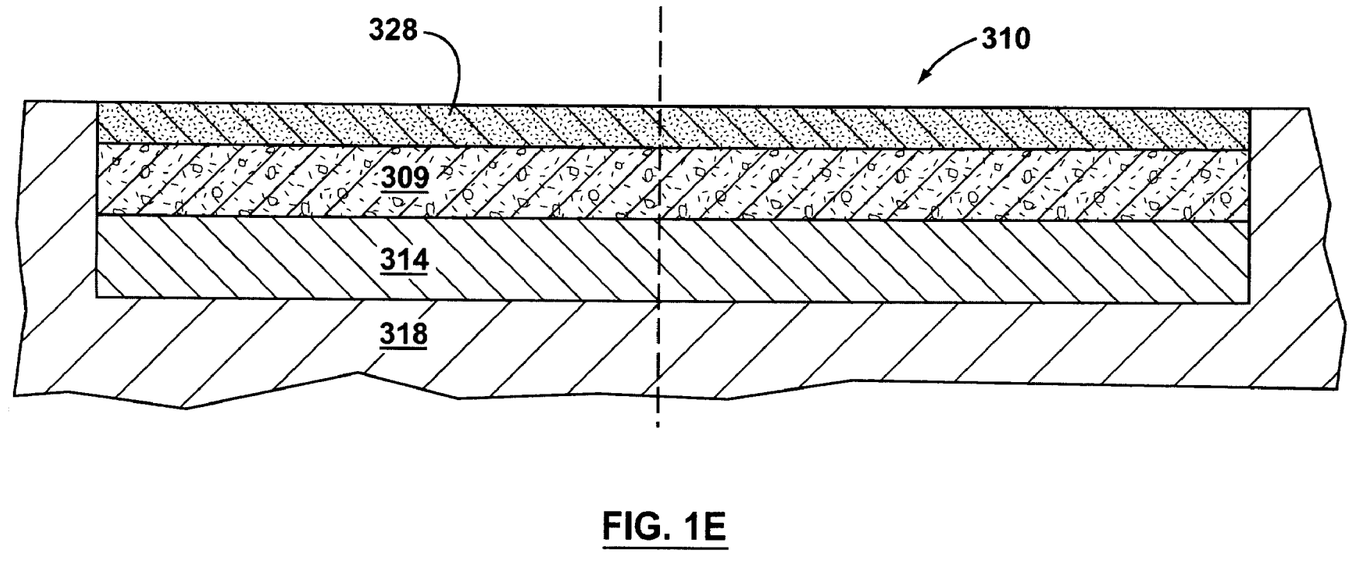
FIG. 1E is a cross-section of a travelled surface comprising the mixture of the invention.
Figure 2:
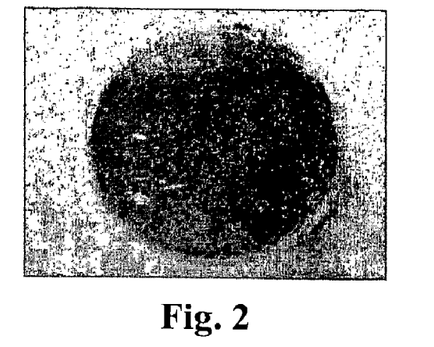
FIG. 2 is a photograph of an embodiment of the mixture of the invention, saturated with water.
Figure 3:
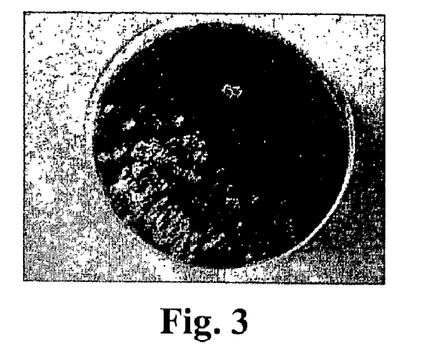
FIG. 3 is a photograph of a mixture of the prior art saturated with water.
Figure 4:
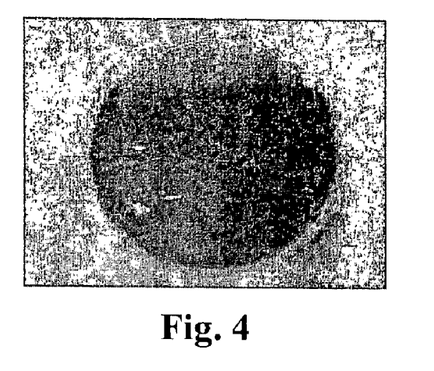
FIG. 4 is a photograph of the mixture of FIG. 3 two days after preparation.
Figure 5:
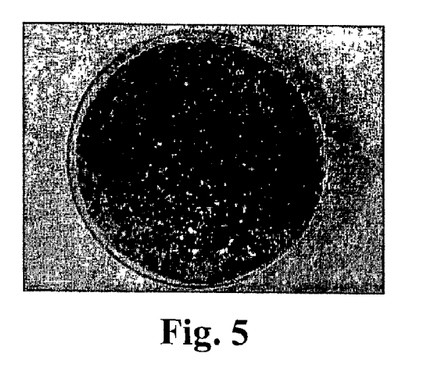
FIG. 5 is a photograph of the mixture of FIG. 4 two days after preparation.
Figure 6:
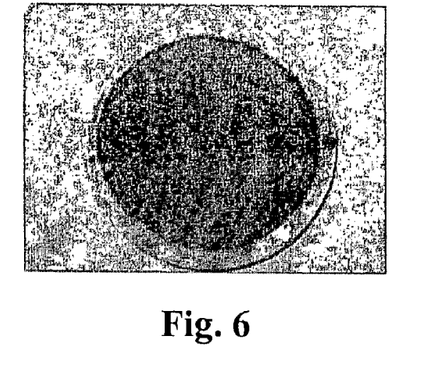
FIG. 6 is a photograph of the mixture of FIG. 3 seven days after preparation.
Figure 7:
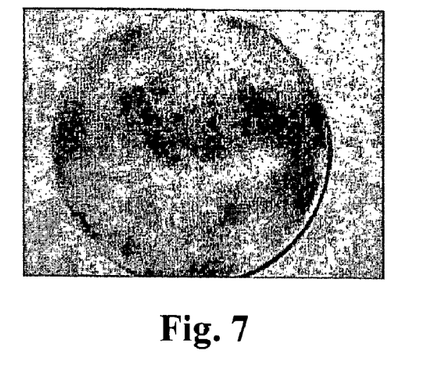
FIG. 7 is a photograph of the mixture of FIG. 4 seven days after preparation.
Figure 8:
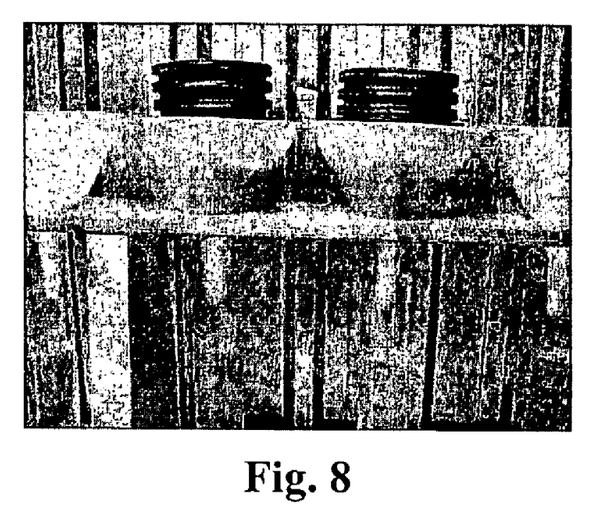
FIG. 8 is a photograph of a device used in testing the resistance of the mixture of the invention to leaching.

Additional embodiments of the invention are shown in FIGS. 1C, 1D, and 1E. In FIGS. 1C, 1D, and 1E, elements are numbered so as to correspond to like elements shown in FIG. 1B.

Where the gaps to be filled are ⅜ inch in width or larger, preferably, a fine crushed angular stone is the aggregate, instead of sand. The optimal gradation specifications for the smaller diameter crushed stone aggregate are set out in Table 2 below. The smaller crushed stone aggregate, the hydrocolloidal agent (e.g., psyllium), and the herbicidal agent (e.g., lime) are mixed together, preferably with the hydrophilic agent (e.g., soda ash), to form the mixture 109. (Alternatively, the binder mixture is mixed with the fine crushed stone to form the mixture 109.)

An embodiment of a travelled surface 110 formed using the mixture of the invention is shown in FIG. 1C. The travelled surface 110 includes pavement stones 112. Base material 114 and bedding material 116 are positioned on a subgrade 18. A geotextile 20 may be positioned between the base 114 and the subgrade 18, if the subgrade 18 is cohesive.

Regular bedding material may be used, or the material 109 may be used as bedding material if preferred. If the material 109 is also used as a bedding material, then the material 109 is spread on the base 114 to a depth of approximately 1 inch. The pavement stones 112 are then positioned on the bedding material.

The mixture of the invention 109 is swept into the gaps. Next, the mixture 109 is watered (preferably, using a fine mist), to the extent necessary to substantially ensure that essentially all the psyllium in the mixture 109 is hydrated. The mixture of the invention is then cured. In general, the mixture of the invention, including the smaller crushed stone, should be allowed to dry for at least about two hours. Depending on weather conditions, however, more time may be necessary or advisable.

TABLE 2

EnviroStone Jointing Material

| Sieve No. | Sieve Size (mm) | Lower Limit | Upper Limit |
| --- | --- | --- | --- |
| 4 | 4.75 | 90% | 100% |
| 8 | 2.36 | 70% | 80% |
| 16 | 1.18 | 50% | 65% |
| 30 | 0.600 | 40% | 50% |
| 50 | 0.300 | 25% | 35% |
| 100 | 0.150 | 20% | 25% |
| 200 | 0.075 | 5% | 15% |
| PAN | PAN | 0% | 5% |

In contrast, if the mixture of the invention is to be used to provide a travelled surface which does not include pavement stones (i.e., hardscaping elements), then the aggregate which is used is, preferably, an angular crushed stone. Optimal gradations for crushed stone which is bulk granite material are set out below in Table 3. Optimal gradation information for crushed stone which is bulk limestone are set out below in Table 4.

The mixture of the invention 209 for providing a travelled surface which does not include hardscaping elements is formed by mixing a crushed stone aggregate with the hydrocolloidal agent (e.g., psyllium) and the herbicidal agent (e.g., lime). Also, the mixture of the invention 209 preferably includes the hydrophilic agent (e.g., soda ash) as well. (Alternatively, the binder mixture is mixed with the crushed stone to form the mixture 209 of the invention.)

In preparing a travelled surface 210 (i.e., without landscaping elements) using crushed stone aggregate, the travelled surface being, for example, a trailway or a driveway, the following procedure is preferred. A cross-section of the travelled surface is shown in FIG. 1D. A base 214, positioned on a subgrade 218, is prepared by levelling and grading the base, generally in accordance with standard road base preparation standards. Preferably, the base includes ¾ crusher run stone. The stone base material should be not less than about 6" thick for a pathway and about 10" thick for a driveway. A crown or an appropriate swale should be included in the base, so that the surface will be appropriately graded when it is completed. Preferably, the base for the pathway is a layer of crushed stone about 150 mm. thick, and the base of the driveway is a layer of crushed stone about 250 mm. thick.

TABLE 3

EnviroStone (bulk granite material)

| Sieve No. | Sieve Size (mm) | Lower Limit | Upper Limit |
| --- | --- | --- | --- |
| 4 | 4.75 | 90% | 100% |
| 8 | 2.36 | 65% | 80% |
| 16 | 1.18 | 50% | 60% |
| 30 | 0.600 | 30% | 45% |
| 50 | 0.300 | 15% | 25% |
| 100 | 0.150 | 10% | 15% |
| 200 | 0.075 | 5% | 10% |
| PAN | PAN | 0% | 5% |

TABLE 4

EnviroStone (bulk limestone material)

| Sieve No. | Sieve Size (mm) | Lower Limit | Upper Limit |
| --- | --- | --- | --- |
| 4 | 4.75 | 90% | 100% |
| 8 | 2.36 | 70% | 90% |
| 16 | 1.18 | 55% | 65% |
| 30 | 0.600 | 35% | 50% |
| 50 | 0.300 | 25% | 35% |
| 100 | 0.150 | 15% | 25% |
| 200 | 0.075 | 5% | 10% |
| PAN | PAN | 0% | 5% |

The crushed stone mixture of the invention 209 is spread on the base to a desired depth, and levelled to grade as required. For a pathway, the mixture of the invention should be approximately 2" (50 mm.) thick. If light vehicular traffic is anticipated (i.e., on a driveway), the thickness should be 2½" (75 mm.) thick. For heavy vehicular traffic, the mixture of the invention should be approximately 3" (77 mm.) thick.

Preferably, the mixture of the invention should not be installed on a rainy day, or in wet conditions. It will be understood that exposure of the entire mixture to water (i.e., from top to bottom of the mixture after spreading) is desirable, in order that particles of the aggregate throughout the mixture after spreading thereof may be relatively uniformly glued together by the hydrocolloidal agent. However, it will also be understood that, as soon as moisture interacts with the hydrocolloidal agent, activation of the hydrocolloidal agent commences, thereby inhibiting, at least to an extent, the filtration of water through the mixture. This occurs because of the swelling of the hydrocolloidal agent which promptly results from its exposure to water. Because of the swelling, spaces between the particles of the aggregate which would otherwise permit water to pass through the aggregate are at least partially blocked.

In addition, the extent of compaction of the mixture of the invention (which compaction is to take place after watering) should be taken into account when the mixture is being spread on the base. For example, if the crushed stone mixture of the invention compacts between 0.25" and 0.5" after final compaction, this should be taken into account when spreading the crushed stone mixture of the invention on the base.

Compaction before saturation should be avoided. This is because compaction before saturation will tend to prevent water from penetrating the entire depth of the layer of the mixture of the invention on the base.

After the crushed stone mixture of the invention 209 has been spread on the base, the mixture is saturated with water. The entire thickness of the crushed stone mixture of the invention is to be saturated. In order to determine that full depth penetration of the water has been achieved, random core sampling should be undertaken.

Once saturated, the mixture of the invention should be allowed to cure, or set up, for between 6 to 24 hours, depending on weather conditions. The surface should have some flexibility, but not so much flexibility that compaction would result in rutting.

The crushed stone mixture of the invention is to be compacted to 95% relative compaction with a roller having a minimum weight of about 500 pounds. In general, compaction weight is proportional to the weight of expected traffic. For example, a foot traffic trail should be compacted with a roller having a minimum weight of about 500 pounds. A driveway should be compacted with a roller having a minimum weight of about 1 ton. Areas that do not receive full compaction from a roller should be hand tamped. If the material sticks to the roller or is rutted by the roller, then further set-up (curing) time is required. A vibratory roller should not be used, because the vibration would tend to disassociate the bond created by the hydrocolloidal agent.

After compaction, at least another 24 hours should be allowed before significant traffic is permitted on the travelled surface 210.

Typically, patch and repair work is relatively easy, because the mixture of the invention is self-repairing, to an extent. For example, small ruts or relatively shallow damaged areas can be remedied by watering, curing, and then scarifying to grade, followed by compaction. More seriously damaged and larger damaged areas can be remedied by adding more product as necessary and raking the product to grade, before saturation, curing, and subsequent compaction.

A limited amount of maintenance may be required. For instance, during the first year after installation, a minor amount of loose aggregate may appear on the surface of the installed mixture of the invention. Typically, if there is a relatively large amount of particles (sand and/or stone) (for example, exceeding approximately ¼" in depth), then these loose particles should be redistributed over the entire surface. Next, the area should be watered thoroughly, so that water saturates the material to a depth of approximately 1" below the surface. The area in question, after curing, should be compacted with a roller having a weight of at least about 1,000 pounds.

Cracking may occur. If cracking occurs, the fines in the vicinity should be swept into the cracks, and the surface in the region of the cracks watered thoroughly. Hand tamping after curing is usually sufficient.

Where damage is more extensive, it may be necessary to excavate the damaged mixture of the invention. For example, after heavy rains, the travelled surface may tend to be somewhat soft. In these conditions, damage to the surface can result if a vehicle's front wheels are sharply turned while the vehicle is stationary on the travelled surface. If the material surrounding the excavated area is dry, then such material should be lightly moistened. An additional quantity of the mixture of the invention is then added into the excavated area. Water is then added to the new material, so that the new material is thoroughly moistened. An appropriate ratio would be approximately 5 litres for every 100 pounds of patch material (i.e., approximately 10% moisture content). After curing, the area should be compacted with a hand tamp or with a roller having the appropriate weight. Preferably, traffic should be kept off repaired areas for approximately 12 to approximately 48 hours after the repair has been completed.

FIG. 1E shows a travelled surface 310 in which a layer of pea stone (pea gravel) 328 is positioned on top of a layer of the mixture 209 of the invention, i.e., the binder mixture, mixed with crushed stone aggregate. The pea stone (or pea gravel) which is directly in contact with the mixture 209 becomes at least partially embedded in the mixture. The pea gravel above the embedded (partially or otherwise) pea gravel remains loose. The depth of pea gravel which is used is dependent on the amount of loose clear stone which is desired.

The pea gravel is spread on the mixture 209 before the mixture 209 is saturated with water initially. After the mixture 209 has cured, the surface is compacted in order to impress the pea gravel, to an extent, into the mixture 209.

Having fully described the present invention, the following test results on certain examples of jointing material of the invention and prior art jointing material are provided to further illustrate the disclosed invention and are not intended to limit the scope of the invention in any manner.

1. Erosion Resistance Test
1.1 Sand Aggregate

An evaluation of differences between a mixture of an aggregate (in this case, sand) and psyllium only (the "Prior Art Sand Mixture") and the preferred embodiment of the mixture of the invention was done through an erosion resistance test, on a laboratory rainfall simulator.

The laboratory rainfall simulator consists of a large metal tray with a number of holes punched in it. The tray is positioned over the samples, which are located in a large sink, or a basin with a drain. Water which is placed in the tray trickles through the holes onto the samples, simulating rainfall. The simulator realistically simulates rainfall over a specified period of time.

Each test lasted for 30 minutes and three sample trays were used for each product. The results are set out below in Table 5.

TABLE 5

Results of an erosion test performed on the Prior Art Sand Mixture and the preferred embodiment Samples

| Material | Number | Initial Weight (g) | Final Weight (g) | Weight Loss (g) | % Weight Loss |
|---|---|---|---|---|---|
| Prior Art | 1 | 200 | 180 | 20 | 10.0 |
| Mixture | 2 | 200 | 178 | 22 | 11.0 |
|  | 3 | 200 | 180 | 20 | 10.0 |
| Average |  |  |  |  | 10.33 |
| Preferred | 1 | 200 | 194 | 6 | 3.0 |
| Embodiment | 2 | 200 | 191 | 9 | 4.5 |
|  | 3 | 200 | 193 | 7 | 3.5 |
| Average |  |  |  |  | 3.66 |

1.2 Crushed Stone Aggregate

Similar tests were conducted on samples which included crushed stone aggregate. The results are set out below in Tables 6-9. In Tables 6-8, "(0.7 binder only)" means that the mixture tested was a prior art mixture of the crushed stone aggregate and 0.7% by weight psyllium. Also, "(0.7, 0.7, 0.5)" indicates an embodiment of the mixture of the invention, namely, 0.7% by weight psyllium, 0.7% by weight lime, and 0.5% by weight soda ash. In Table 9, "(1.0, 1.0, 0.7)" indicates that another embodiment of the mixture of the invention was tested, namely, crushed stone aggregate and 1.0% by weight psyllium, 1.0% by weight lime, and 0.7% by weight soda ash.

TABLE 6

Erosion Analysis
Material: Company "A" bulk materials (Products "A" and "B")
Sample Date: 3 Aug. 2005 to 5 Aug. 2005
First Run

| Sample ID | Initial Mass (Tray and Stone) (g) | Final Mass (Tray and Stone) (g) | Stone Mass (g) | Stone Mass Lost (g) | Percent of Stone Loss in First Run (%) |
|---|---|---|---|---|---|
| B 1 (0.7 binder only) | 403 | 384 | 203 | 19 | 9.36% |
| B 2 (0.7 binder only) | 389 | 367 | 204 | 22 | 10.78% |
| Average | | | | | 10.07% |
| A 1 (0.7 binder only) | 384 | 358 | 205 | 26 | 12.68% |
| A 2 (0.7 binder only) | 410 | 322 | 206 | 88 | 42.72% |
| Average | | | | | 27.70% |
| B 3 (0.7, 0.7, 0.5) | 383 | 382 | 204 | 1 | 0.49% |
| B 4 (0.7, 0.7, 0.5) | 390 | 389 | 205 | 1 | 0.49% |
| Average | | | | | 0.49% |
| A 3 (0.7, 0.7, 0.5) | 409 | 408 | 206 | 1 | 0.49% |
| A 4 (0.7, 0.7, 0.5) | 410 | 410 | 206 | 0 | 0.00% |
| Average | | | | | 0.24% |

| Sample ID | Initial Mass (Tray and Stone) (g) | Final Mass (Tray and Stone) (g) | Stone Mass (g) | Stone Mass Lost (g) | Percent of Stone Loss in First Run (%) | Percent of Total Stone Loss (%) |
|---|---|---|---|---|---|---|
| B 1 (0.7 binder only) | 384 | 374 | 184 | 10 | 5.43% | 14.29% |
| B 2 (0.7 binder only) | 367 | 361 | 182 | 6 | 3.30% | 13.73% |
| Average | | | | | 4.37% | 14.01% |
| A 1 (0.7 binder only) | 358 | 344 | 179 | 14 | 7.82% | 19.51% |
| A 2 (0.7 binder only) | 322 | 316 | 118 | 6 | 5.08% | 45.63% |
| Average | | | | | 6.45% | 32.57% |
| B 3 (0.7, 0.7, 0.5) | 382 | 381 | 203 | 1 | 0.49% | 0.98% |
| B 4 (0.7, 0.7, 0.5) | 389 | 388 | 204 | 1 | 0.49% | 0.98% |
| Average | | | | | 0.49% | 0.98% |
| A 3 (0.7, 0.7, 0.5) | 408 | 407 | 205 | 1 | 0.49% | 0.97% |
| A 4 (0.7, 0.7, 0.5) | 410 | 409 | 206 | 1 | 0.49% | 0.49% |
| Average | | | | | 0.49% | 0.73% |

TABLE 7

Erosion Analysis
Material: "C" and "D" bulk materials
Sample Date: 2 Aug. 2005 to 4 Aug. 2005
First Run

| Sample ID | Initial Mass (Tray and Stone) (g) | Final Mass (Tray and Stone) (g) | Stone Mass (g) | Stone Mass Lost (g) | Percent of Stone Loss in First Run (%) |
|---|---|---|---|---|---|
| C 1 (0.7 binder only) | 383 | 260 | 206 | 123 | 59.71% |
| C 2 (0.7 binder only) | 391 | 242 | 206 | 149 | 72.33% |
| Average | | | | | 66.02% |
| D 1 (0.7 binder only) | 394 | 247 | 208 | 147 | 70.67% |
| D 2 (0.7 binder only) | 407 | 262 | 207 | 145 | 70.05% |
| Average | | | | | 70.36% |
| C 3 (0.7, 0.7, 0.5) | 408 | 406 | 208 | 2 | 0.96% |
| C 4 (0.7, 0.7, 0.5) | 391 | 389 | 213 | 2 | 0.94% |
| Average | | | | | 0.95% |
| D 3 (0.7, 0.7, 0.5) | 383 | 379 | 205 | 4 | 1.95% |
| D 4 (0.7, 0.7, 0.5) | 409 | 401 | 207 | 8 | 3.86% |
| Average | | | | | 2.91% |

TABLE 8

| Sample ID | Initial Mass (Tray and Stone) (g) | Final Mass (Tray and Stone) (g) | Stone Mass (g) | Stone Mass Lost (g) | Percent of Stone Loss in First Run (%) | Percent of Total Stone Loss (%) |
|---|---|---|---|---|---|---|
| C 1 (0.7 binder only) | 260 | 237 | 83 | 23 | 27.71% | 70.87% |
| C 2 (0.7 binder only) | 242 | 226 | 57 | 16 | 28.07% | 80.10% |
| Average | | | | | 27.89% | 75.49% |
| D 1 (0.7 binder only) | 247 | 213 | 61 | 34 | 55.74% | 87.02% |
| D 2 (0.7 binder only) | 262 | 232 | 62 | 30 | 48.39% | 84.54% |
| Average | | | | | 52.06% | 85.78% |
| C 3 (0.7, 0.7, 0.5) | 406 | 405 | 206 | 1 | 0.49% | 1.44% |
| C 4 (0.7, 0.7, 0.5) | 389 | 388 | 211 | 1 | 0.47% | 1.41% |
| Average | | | | | 0.48% | 1.43% |
| D 3 (0.7, 0.7, 0.5) | 379 | 377 | 201 | 2 | 1.00% | 2.93% |
| D 4 (0.7, 0.7, 0.5) | 401 | 400 | 199 | 1 | 0.50% | 4.35% |
| Average | | | | | 0.75% | 3.64% |

TABLE 9

Erosion Analysis
Material: Limestone product "E"
Date: 6 Jun. 2005 to 8 Jun. 2005

First Run

| Sample ID | Initial Mass (Tray and Sand) (g) | Final Mass (Tray and Sand) (g) | Stone Mass (g) | Mass of Stone Lost (g) | Percent of Stone Loss in First Run (%) |
|---|---|---|---|---|---|
| E 1 (1.0. 1.0, 0.7) | 372 | 370 | 187 | 2 | 1.07% |
| E 2 (1.0, 1.0, 0.7) | 374 | 373 | 174 | 1 | 0.57% |
| E 3 (1.0, 1.0, 0.7) | 366 | 366 | 189 | 0 | 0.00% |
| E 4 (1.0, 1.0, 0.7) | 365 | 364 | 186 | 1 | 0.54% |
| Average | | | | | 0.55% |
| E 1 (0.8% Binder only) | 363 | 345 | 184 | 18 | 9.78% |
| E 2 (0.8% Binder only) | 386 | 360 | 186 | 26 | 13.98% |
| E 3 (0.8% Binder only) | 366 | 331 | 186 | 35 | 18.82% |
| E 4 (0.8% Binder only) | 365 | 349 | 180 | 16 | 8.89% |
| Average | | | | | 12.87% |

Second Run

| Sample ID | Initial Mass (Tray and Sand) (g) | Final Mass (Tray and Sand) (g) | Stone Mass (g) | Mass of Stone Lost (g) | Percent of Stone Loss in Second Run (%) | Percent of Total Stone Loss (%) |
|---|---|---|---|---|---|---|
| E 1 (1.0. 1.0, 0.7) | 370 | 364 | 185 | 6 | 3.24% | 4.28% |
| E 2 (1.0, 1.0, 0.7) | 373 | 370 | 173 | 3 | 1.73% | 2.30% |
| E 3 (1.0, 1.0, 0.7) | 366 | 362 | 189 | 4 | 2.12% | 2.12% |
| E 4 (1.0, 1.0, 0.7) | 364 | 362 | 185 | 2 | 1.08% | 1.61% |
| Average | | | | | 2.04% | 2.58% |
| E 1 (0.8% Binder only) | 345 | 330 | 166 | 15 | 9.04% | 17.93% |
| E 2 (0.8% Binder only) | 360 | 353 | 160 | 7 | 4.38% | 17.74% |
| E 3 (0.8% Binder only) | 331 | 326 | 151 | 5 | 3.31% | 21.51% |
| E 4 (0.8% Binder only) | 349 | 343 | 164 | 6 | 3.66% | 12.22% |
| Average | | | | | 5.10% | 17.35% |

2. Longevity 2.1 Microbiological Action

Different compositions of the preferred embodiment of the mixture of the invention were placed in petri dishes with the purpose of evaluating their consistency after being mixed with water, and their reaction in contact with air. This aspect is important with regard to the longevity of the binder (psyllium) within the aggregate (in this example, sand) over different conditions.

It was observed that a composition of psyllium, lime and soda ash, at proportions of 1%, 1%, and 0.2% (by weight) respectively, presented a more homogeneous and elastic consistency than the mixture including only psyllium with sand aggregate (i.e., the Prior Art Sand Mixture).

Furthermore, as shown in FIGS. 3-8, the psyllium in the Prior Art Sand Mixture was promptly infested by fungi, which were visible at the second day after sample preparation, and covered the material completely, seven days later, proving to be a good medium for microbial growth. However, the preferred embodiment composition (i.e., sand aggregate, psyllium, lime, and soda ash) did not show this kind of growth, confirming the effect of the lime in deterring fungi growth. This is evidence of an increase of longevity provided by the presence of the additives (i.e., lime and soda ash) in the preferred mixture of the invention.

2.2 Leaching

A test consisting of letting a predetermined amount of water percolate through a defined weight of samples of the mixture of the invention was performed with the purpose of studying the effect of leaching. Leaching of the hydrocolloidal agent out of the mixture including aggregate and the hydrocolloidal agent would result in the overall stability of the mixture of material.

The samples were placed in containers with porous bottoms, and the water added to them was collected in glass cylinders. Sample weight was 500 g and a volume of 0.5 liters was added and allowed to drain, in a total of 10 continuous runs. The total water percolation volume was equivalent to 636.62 mm rainfall infiltrated in 100%. The test was run on dry sand, not pre-saturated and allowed to dry, which means that the conditions were even more favorable for maximum material leaching. FIG. 9 shows the testing device. The sample material was placed in the dark-colored container at the top, and water was put onto the sample material and collected underneath.

After the test the washed mixture of the invention was placed on erosion resistance measuring trays, to evaluate the decrease of their stability as a result of loss of binding material through leaching. The samples were tested on the rainfall simulator for 30 minutes, and the samples were observed to resist erosion well. It was observed that samples of the preferred embodiment of the mixture of the invention presented less damage than those of the Prior Art Sand Mixture, and a closer observation shows more damage on the Prior Art Sand Mixture samples, with deeper cuts provoked by raindrop impact and more evident sheet erosion. Results are as shown in Table 10.

TABLE 10

Results of the erosion/leaching test performed on washed Prior Art Sand Mixture and the preferred embodiment

| Material | Number | Initial Weight (g) | Final Weight (g) | Weight Loss (g) | Weight Loss (%) |
|---|---|---|---|---|---|
| Prior Art Sand | 1 | 226 | 177 | 49 | 21.68 |
| Mixture | 2 | 217 | 194 | 23 | 10.60 |
| Average | | | | | 16.14 |
| Preferred | 1 | 228 | 211 | 17 | 7.46 |
| Embodiment | 2 | 221 | 212 | 9 | 4.07 |
| Average | | | | | 5.77 |

In summary, the results of the percolation tests which were performed on the Prior Art Sand Mixture and the preferred embodiment of the mixture of the invention show that, after hardening, the presence of lime appears to result in a decrease of the water percolation rate. A lower water percolation rate in turn results in a lower vertical transport capacity of residues through leaching. It has also been observed that after the percolation test the samples of the preferred embodiment of the mixture of the invention appeared to be stronger than the Prior Art Sand Mixture, indicating better erosion resistance.

2.3 Weed Deterrence

This aspect was studied by comparing the germination capacity and growth of weed seeds in pots with (i) regular sand (i.e., aggregate only), (ii) the Prior Art Sand Mixture, and (iii) the preferred embodiment of the mixture of the invention. Previous tests performed to confirm the weed deterrence effect of the aggregate material containing lime have shown that the presence of lime limited significantly the growth of seedlings, in comparison with the material without lime.

A germination test on untreated sand, the Prior Art Sand Mixture and the mixture of the invention has shown that germination is slowed somewhat with the Prior Art Sand Mixture, by the effect of the sand particles being bound together, making it difficult for seedlings to grow. Growth is definitely deterred further with the addition of the lime and soda ash additives, i.e., in the mixture of the invention, because of the elevated gel strength which results in the sand particles being held together more strongly, as well as elevating the pH to levels where growth conditions are generally unfavorable.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. A mixture of materials for providing at least a portion of a travelled surface, the mixture comprising:
    at least about 95% and at most about 99.6% by weight an aggregate;
    at least about 0.3% and at most about 2.5% by weight a hydrocolloidal agent; and
    at least about 0.1% and at most about 2.5% by weight lime, the mixture having a pH between about 9 and about 12; and
    at least about 0.1% and at most about 2.5% by weight a hydrophilic agent.

2. A mixture according to claim 1 in which the hydrocolloidal agent is psyllium.

3. A mixture according to claim 1 in which the hydrophilic agent comprises soda ash.

\* \* \* \* \*